United States Patent
Warren

(10) Patent No.: US 9,181,818 B2
(45) Date of Patent: Nov. 10, 2015

(54) THERMALLY CONSTRAINED HIGH TEMPERATURE OPTICAL FIBER HOLDER

(71) Applicant: United Technologies Corporation, Hartford, CT (US)

(72) Inventor: Eli Cole Warren, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 263 days.

(21) Appl. No.: 13/626,099

(22) Filed: Sep. 25, 2012

(65) Prior Publication Data

US 2014/0083215 A1 Mar. 27, 2014

(51) Int. Cl.
*G01D 11/30* (2006.01)
*F01D 17/02* (2006.01)
*G01D 5/353* (2006.01)

(52) U.S. Cl.
CPC ............... *F01D 17/02* (2013.01); *G01D 11/30* (2013.01); *F05D 2300/50212* (2013.01); *G01D 5/353* (2013.01); *Y10T 29/49229* (2015.01)

(58) Field of Classification Search
CPC ........ G01D 11/30; G01D 5/353; F01D 17/02; F05D 2300/50212; Y10T 29/49229
USPC ......................................................... 73/866.5
See application file for complete search history.

(56) References Cited

U.S. PATENT DOCUMENTS

| | | | |
|---|---|---|---|
| 4,329,644 A | 5/1982 | Libertini et al. | |
| 4,691,985 A * | 9/1987 | Shank et al. | 385/84 |
| 4,818,948 A | 4/1989 | Dooley | |
| 4,970,907 A * | 11/1990 | Flynn | 73/866.5 |
| 5,201,227 A * | 4/1993 | Iinuma et al. | 73/655 |
| 5,277,496 A | 1/1994 | Mayer et al. | |
| 5,557,099 A * | 9/1996 | Zielinski et al. | 250/227.11 |
| 5,659,133 A | 8/1997 | Sims et al. | |
| 5,828,797 A | 10/1998 | Minott et al. | |
| 6,655,857 B2 | 12/2003 | Allan | |
| 6,773,678 B2 | 8/2004 | Cummings et al. | |
| 6,819,122 B2 | 11/2004 | Slates | |
| 6,923,048 B2 * | 8/2005 | Willsch et al. | 73/112.01 |
| 7,095,910 B2 | 8/2006 | Blake et al. | |
| 7,987,712 B2 * | 8/2011 | Myhre et al. | 73/431 |
| 8,164,761 B2 | 4/2012 | Kominsky | |
| 8,256,297 B2 * | 9/2012 | Sue et al. | 73/643 |
| 2002/0162394 A1 | 11/2002 | Loftus et al. | |

(Continued)

OTHER PUBLICATIONS

International Search Report and Written Opinion for International Application No. PCT/US2013/061577 mailed Dec. 26, 2013.

(Continued)

*Primary Examiner* — Daniel S Larkin
(74) *Attorney, Agent, or Firm* — Carlson, Gaskey & Olds, P.C.

(57) ABSTRACT

A disclosed probe assembly includes a sensor member and an outer holder including a main bore for the sensor member, the outer holder including a first coefficient of thermal expansion. The sensor member is held within a sensor bore of an inner holder. The inner holder is held within the main bore of the outer holder by an interference fit. The inner holder includes a second coefficient of thermal expansion greater than the first coefficient of thermal expansion. Expansion of the inner holder is constrained by the outer holder to maintain the sensor member within the probe bore of the inner holder at elevated temperatures.

8 Claims, 6 Drawing Sheets

(56) References Cited

U.S. PATENT DOCUMENTS

2006/0285813 A1 12/2006 Ferguson
2009/0244727 A1 10/2009 Ishii et al.
2010/0171956 A1 7/2010 Sappey et al.
2011/0231171 A1 9/2011 Jousselin

OTHER PUBLICATIONS

International Preliminary Report on Patentability for PCT Application No. PCT/US2013/061577, mailed Apr. 9, 2015.

* cited by examiner

THERMALLY CONSTRAINED HIGH TEMPERATURE OPTICAL FIBER HOLDER

BACKGROUND

This disclosure relates generally to the assembly of an optical probe and, more particularly, to a mounting assembly for retaining optical components in a high temperature environment of a gas turbine engine.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Measurement and observation of components during operation of a gas turbine engine can be useful in improving overall operational efficiency. Probes are utilized in tip-timing systems that observe and measure arrival times of rotor, compressor or fan blades. One type of probe utilizes an optical fiber mounted within a static structure proximate the rotating blade. Such mounting locations expose the optical fiber to extreme temperature environment within the engine. Optical fibers are typically adhered by an epoxy to probe housings which are held within apertures of the case structure. Epoxy is susceptible to failure due to exposure to extreme temperatures encountered during operation. It is therefore desirable to design and develop simplified mounting structures for probes and or other optical components that are compatible at high temperature and extreme environments.

SUMMARY

A probe assembly according to an exemplary embodiment of this disclosure, among other possible things includes a sensor member, and a holder including a sensor bore receiving the sensor member. The holder includes a coefficient of thermal expansion greater than a coefficient of thermal expansion of the sensor member.

In a further embodiment of the foregoing probe assembly, the holder comprises an outer holder which includes a main bore for the sensor member. The outer holder includes a first coefficient of thermal expansion. An inner holder includes a sensor bore receiving the sensor member. The inner holder is disposed within the main bore. The inner holder includes a second coefficient of thermal expansion greater than the first coefficient of thermal expansion.

In a further embodiment of any of the foregoing probe assemblies, the sensor member comprises an optical fiber.

In a further embodiment of any of the foregoing probe assemblies, the sensor member includes a coefficient of thermal expansion substantially similar to the outer holder.

In a further embodiment of any of the foregoing probe assemblies, the main bore includes a first end open to a sensed object with the inner holder disposed near the first end.

In a further embodiment of any of the foregoing probe assemblies, the main bore includes a lip at the first end for holding the inner holder within the bore.

In a further embodiment of any of the foregoing probe assemblies, includes a lens received within the main bore at the first end.

In a further embodiment of any of the foregoing probe assemblies, the lens is disposed within a lens housing that is in turn disposed within the main bore. The lens housing includes a coefficient of thermal expansion greater than that of the outer housing.

A gas turbine engine case assembly according to an exemplary embodiment of this disclosure, among other possible things includes a case provided about a rotational axis of a gas turbine engine, and at least one probe assembly supported within the case. The probe assembly includes a sensor member, and an outer holder including a main bore for the sensor member. The outer holder includes a first coefficient of thermal expansion. An inner holder includes a sensor bore receiving the sensor member. The inner holder is disposed within the main bore. The inner holder includes a second coefficient of thermal expansion greater than the first coefficient of thermal expansion.

In a further embodiment of the foregoing gas turbine engine case assembly, the sensor member comprises an optical fiber.

In a further embodiment of any of the foregoing gas turbine engine case assemblies, the main bore includes a first end open to a sensed object with the inner holder disposed near the first end.

In a further embodiment of any of the foregoing gas turbine engine case assemblies, the main bore includes a lip at the first end for holding the inner holder within the bore.

In a further embodiment of any of the foregoing gas turbine engine case assemblies, includes a lens received within the main bore at the first end.

In a further embodiment of any of the foregoing gas turbine engine case assemblies, includes a lens holder receiving the lens and fit within the main bore. The lens holder has a coefficient of thermal expansion greater than that of outer housing.

In a further embodiment of any of the foregoing gas turbine engine case assemblies, the sensor bore includes a relief expanding radially outward.

In a further embodiment of any of the foregoing gas turbine engine case assemblies, the probe assembly includes a probe housing supporting the outer holder and the case includes openings for the receiving the probe housing.

A method of retaining a probe within a gas turbine engine according to an exemplary embodiment of this disclosure, among other possible things includes assembling a probe member into a probe bore defined within an inner holder, inserting an inner holder within a main bore defined within an outer holder. The inner holder includes a coefficient of thermal expansion greater than the outer holder, and inserting outer holder within an opening of a static structure of a gas turbine engine.

In a further embodiment of the foregoing method, includes the step of heating the inner holder to expand the probe bore to receive the probe member followed by subsequent cooling of the inner holder once the probe is inserted into the inner holder.

In a further embodiment of any of the foregoing methods, includes the step of heating the outer holder to expand the main bore to receive the inner holder followed by subsequent cooling of the outer holder once the inner holder is inserted within the main bore.

In a further embodiment of any of the foregoing methods, includes the step of installing a lens within a lens housing by heating the lens housing and inserting the lens within the lens housing followed by cooling to room temperature and subsequent insertion into the main bore proximate an end of the probe member.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
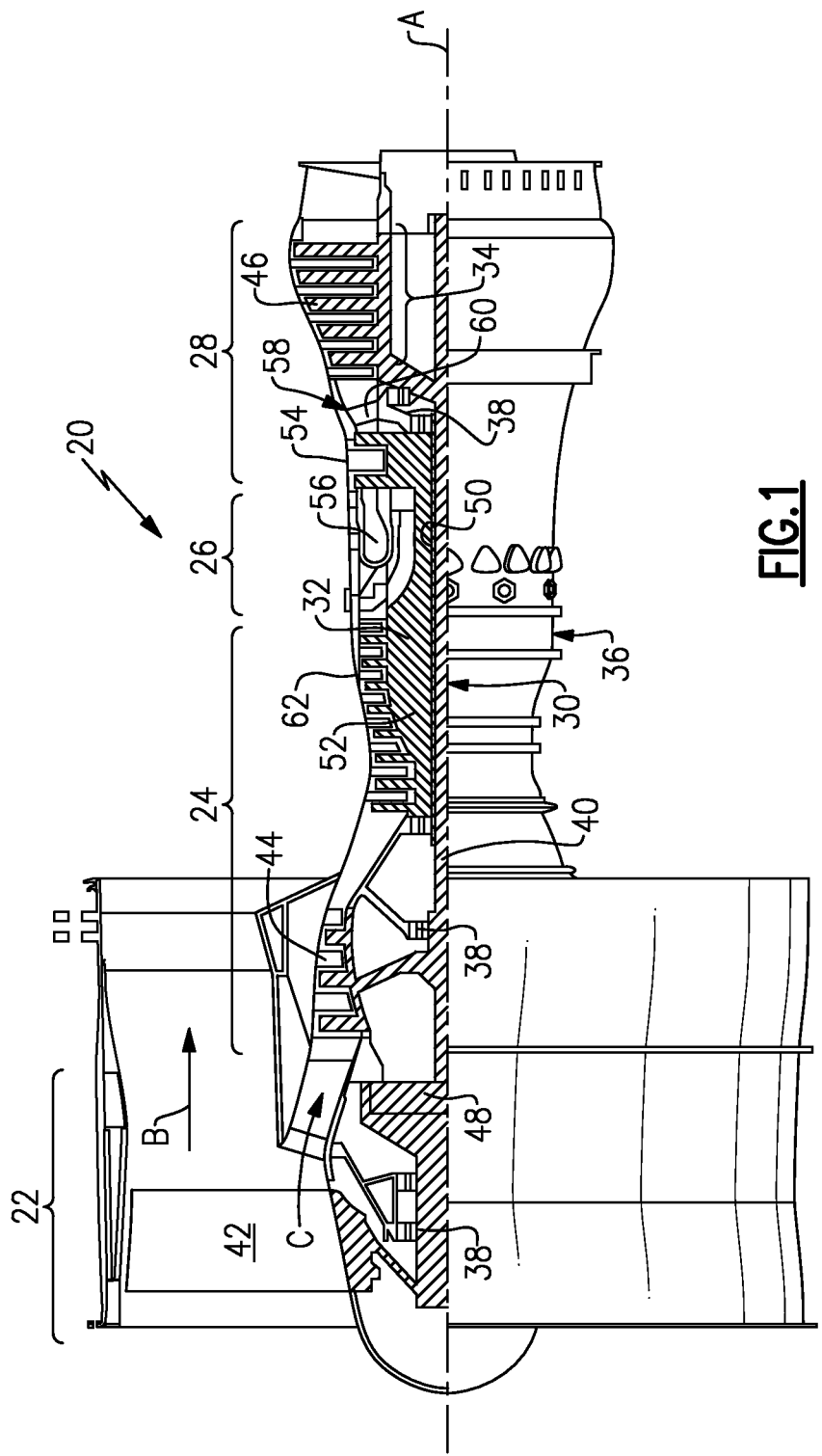
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section. Moreover, an industrial gas turbine engine utilized for producing power may also benefit from this disclosure.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (1 bm) of fuel per hour being burned divided by pound-force (1 bf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }°R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine engine 20 includes a compressor case 62 that is part of the engine static structure 36. The compressor case 62 surrounds the high pressure compressor 52.

Figure 2:
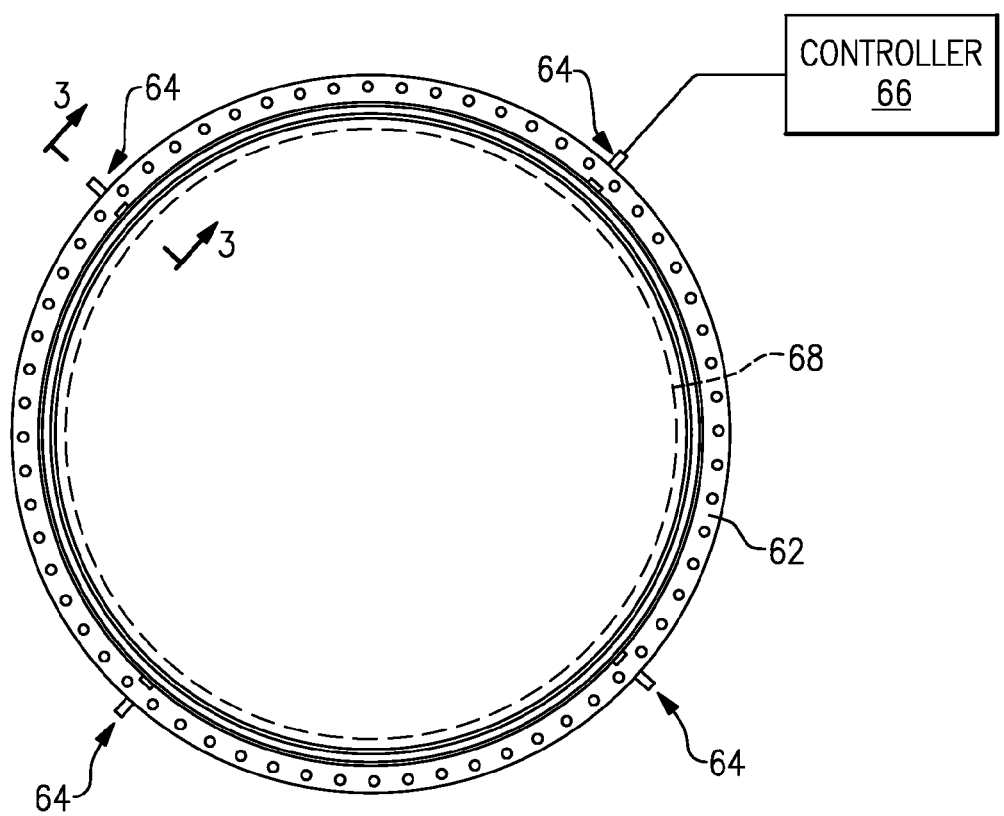
FIG. 2 is a schematic view of an example case structure for the example gas turbine engine.

Referring to FIG. 2 with continued reference to FIG. 1, the example case structure 62 surrounds the compressor 52 and rotating blades indicated schematically by dashed lines at 68 that rotate proximate to the case structure 62. The example case structure 62 includes a plurality of sensor assemblies 64 that communicate with the controller 66. The sensor assemblies 64 are utilized in this example to detect the passing blades 68. Detection of a blade 68 as it passes one of the sensor assemblies 64 is utilized for tip timing functions and other health monitoring features of the example gas turbine engine 20. The high pressure compressor 52 operates at elevated temperatures and therefore requires that the sensor assemblies 64 are suitable for operation at such elevated temperatures.

Figure 3:
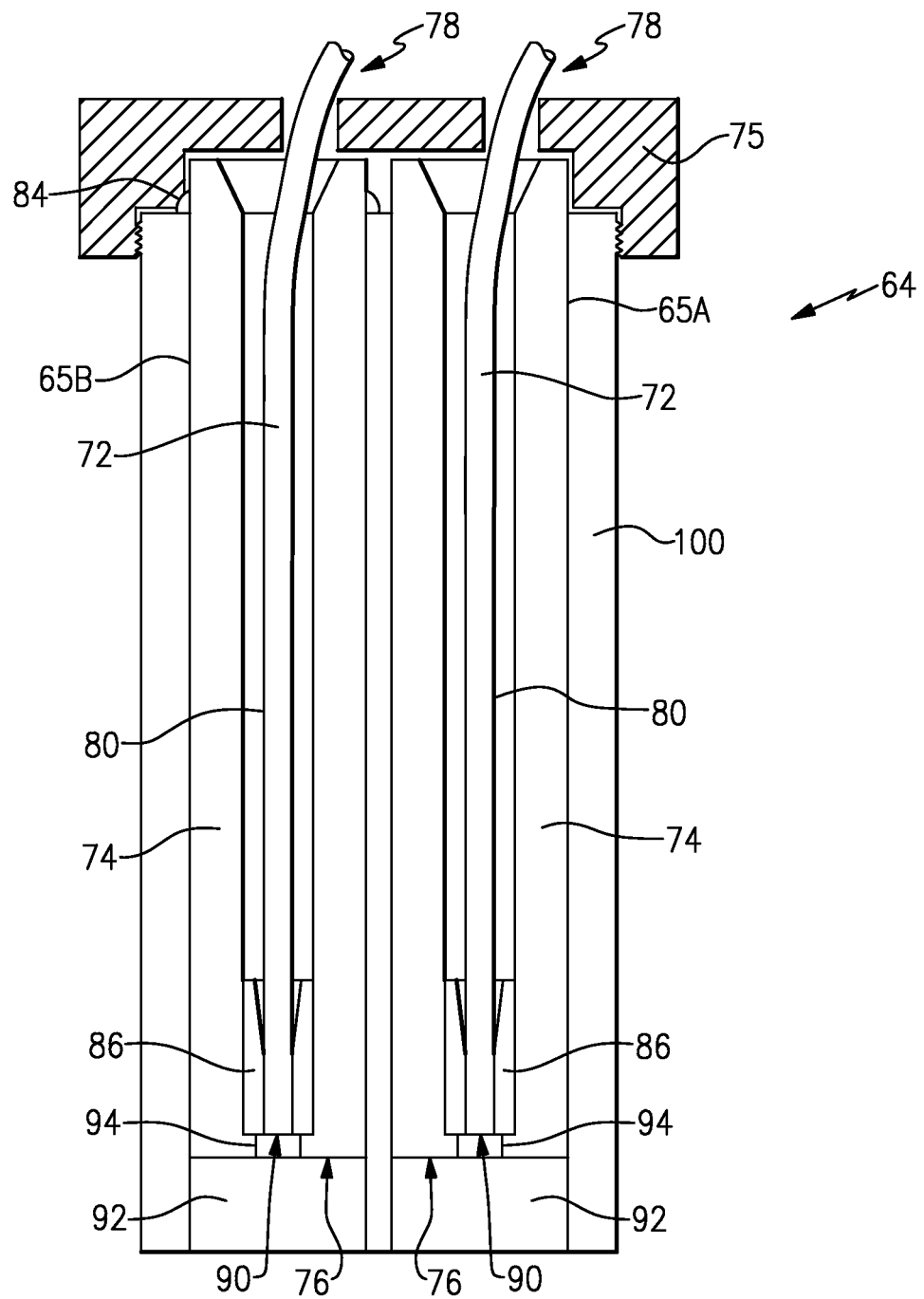
FIG. 3 is a sectional view of an example sensor assembly.

Referring to FIG. 3, an example sensor assembly 64 includes a first probe assembly 65a and a second probe assembly 65b. Each of the example probe assemblies 65a-b is substantially similar in configuration. The probe assemblies 65a and 65b are disposed within a common housing 100. The housing 100 is provided for supporting the probe assembly 65a and 65b and is mountable within the case structure 62.

Each of the probe assemblies 65a and 65b include a sensor member. In the disclosed example, the sensor member comprises an optical fiber 72. The optical fiber 72 is held within an inner holder 86 supported within an outer holder 74 that is in turn supported within the housing 100. The inner holder 86 is fit by way of an interference fit within a main bore 80 of the outer holder 74. The outer holder 74 is held within the housing 100 by a fastening member 75. The fastening member 75 holds both outer holders 74 of each of the probe assemblies 65a, 65b within the housing 100. In this example, the fastener 75 is a threaded member that is secured to the housing 100. However, other fastening structures and methods, such as a weld 84 may be utilized to hold each of the outer holders 74 within the housing 100 and are within the contemplation of this disclosure. Moreover, the housing 100 may be held within the case 62 by welds, fasteners along with any other fastening process compatible with the environment of the engine 20.

The optical fiber 72 is held within the inner holder 86 by an interference fit. The interference fit provides sufficient frictional engagement on the optical fiber 72 to hold an end 90 of the optical fiber 72 in a desired orientation relative to the probe end 76 of the sensor assembly 64. An outer end 78 of the optical fiber 72 extends out of the fastener member 75. The inner holder 86 includes a coefficient of thermal expansion that is much greater than the coefficient of thermal expansion of the optical fiber 72. Because the inner holder 86 has a coefficient of thermal expansion that is much higher than the optical fiber 72, the inner holder 86 may be heated to a temperature that expands the inner diameter an amount determined to receive the optical fiber 72 and provide for placement of the optical fiber 72 within the inner holder 86. Upon cooling of the inner holder 86, the inner diameter will shrink such that it will hold the optical fiber 72 within the inner holder 86 with the desired interference fit.

The outer holder 74 includes a second coefficient of thermal expansion that is much less than that of the inner holder 86. The outer holder 74 is heated to a temperature that allows for the inner holder 86 to slide within the bore 80 and the probe end 76. Once the inner holder 86 is positioned as is desired within the outer holder 74, the outer holder 74 and the inner holder 86 are cooled to room temperature such that an interference fit is created between the inner holder 86 and the bore 80 of the outer holder 74.

The bore 80 of the outer holder 74 includes a lip 94 that abuts the inner holder 86 and positions the inner holder 86 within the bore 80 proximate opening 96. As appreciated, although a lip 94 is shown in the illustrated and disclosed embodiment, other features for locating the inner holder 86 could also be utilized.

A lens 92 is received within the housing 100 proximate to the outer holder 74. In this example, the lens 92 is secured within the housing 100 proximate the probe ends 76 by way of an epoxy or other adhesive fastening compound.

Figure 4:
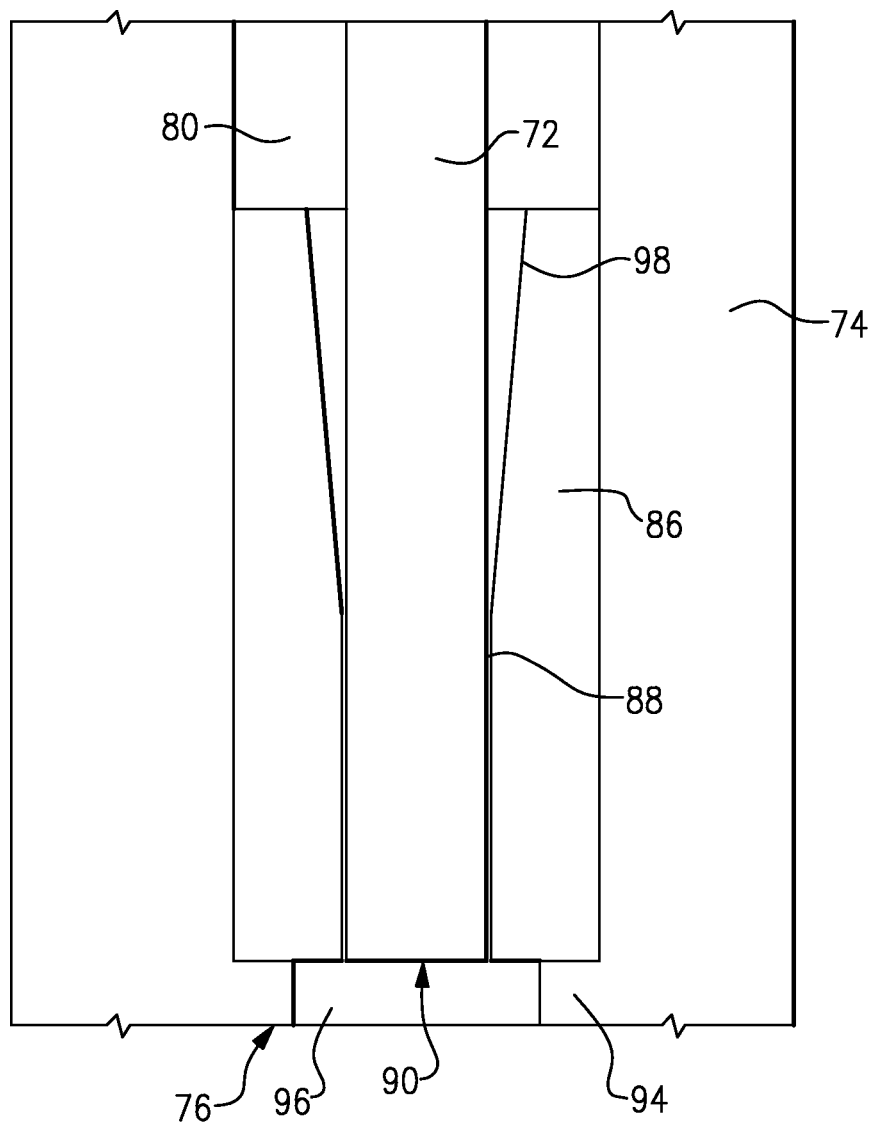
FIG. 4 is an enlarged view of an inner housing of an example probe assembly.

Referring to FIG. 4 within continued reference to FIG. 3, the example inner holder 86 is shown disposed within the bore 80 of the outer holder 74. The inner holder 86 includes the bore 88 that receives the optical fiber 72. A relief 98 is disposed at one end of the bore 88 to allow some movement and substantially reduce the possibility of damage to the optical fiber 72. The bore 88 is sized to provide an interference fit with optical fibers 72 when both the optical fiber 72 and inner holder 86 are at a common temperature.

The inner holder 86 includes a coefficient of thermal expansion that is much greater than that of the optical fiber 72. In the disclosed example, the optical fiber 72 includes a coefficient of linear thermal expansion that is between approximately 4.0 and 5.0 micro-inch/inch/° F. The inner holder 86 includes a coefficient of linear thermal expansion that is between approximately 10 and 14 micro-inch/inch/° F.

As should be appreciated the coefficient of thermal expansion may refer to a volumetric area and linear changes in a structure's dimensions due to exposure to elevated temperatures. In the disclosed example the units of thermal expansion are provided with reference to linear thermal expansion, however volumetric and area expansion due to temperature are also within the contemplation of this disclosure.

In this example, the inner holder 86 comprises a stainless steel material within a very high coefficient of thermal expansion as compared to the optical fiber 72. The difference in rates of thermal expansion between the inner holder 86 and the optical fiber 72 provide for the inner holder 86 to be heated to a relatively low temperature while still expanding the bore 88 sufficiently to receive the optical fiber 72. Upon cooling of the inner holder 86, the bore 88 will contract and generate the desired interference fit with the optical fiber 72.

The outer holder 74 includes a coefficient of linear thermal expansion of between approximately 4.0 and 6.0 micro-inch/inch/° F. The relatively low coefficient of linear thermal expansion provides a counter acting means to prevent the optical fiber 72 from being released from the bore 88 of the inner holder 86.

During operation elevated temperatures of the sensor assembly 64 will heat the inner holder 86 and the outer holder 74. Because the inner holder 86 has a much higher coefficient of thermal expansion, it will attempt to expand such that bore 88 may open to a diameter that would allow the optical fiber 72 to shift from its desired position. However, because the inner holder 86 is disposed within the outer holder 74 and the outer holder 74 includes a coefficient of thermal expansion that is much lower than that of the inner holder 88, the outward expansion of the inner holder 86 is constrained by the outer holder 74 such that the bore 88 does not open under extreme temperatures and the optical fiber 72 is maintained in a desired orientation relative to the probe end 76.

Figure 5:
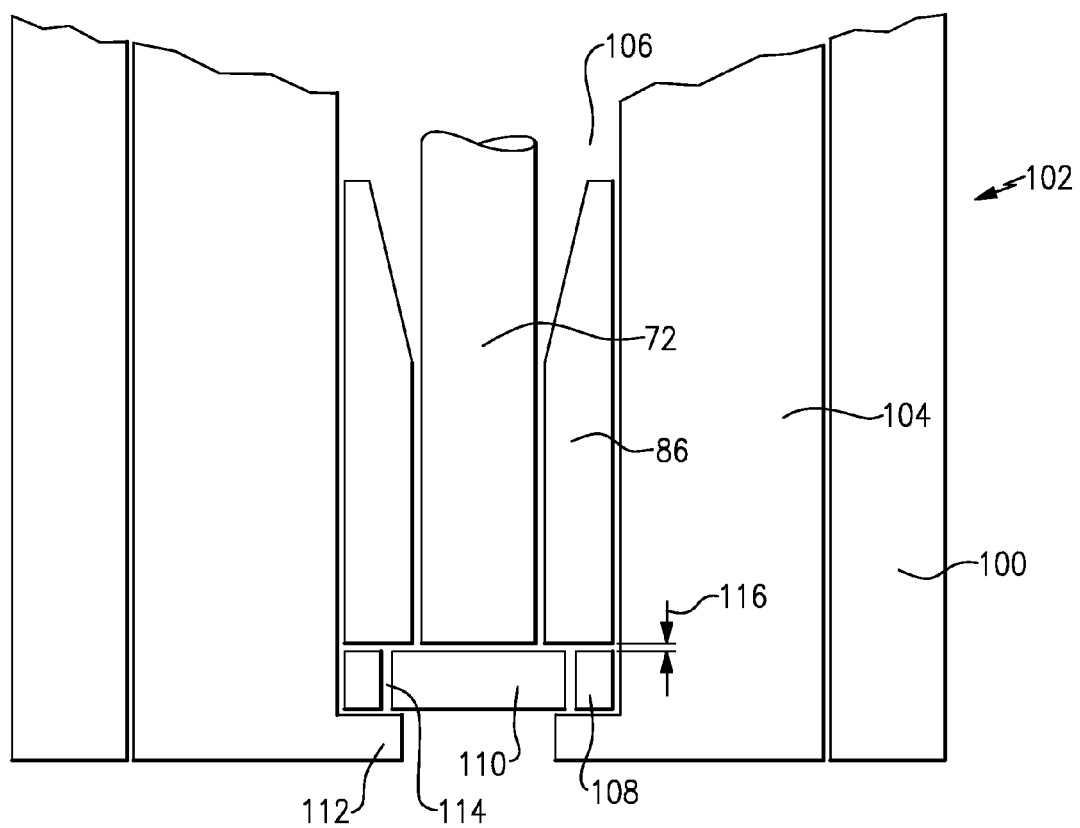
FIG. 5 is a schematic view of another example probe assembly.

Referring to FIG. 5, another probe assembly 102 is illustrated and includes a lens 110 that is held within a lens housing 108. The lens housing 108 includes a material with a high coefficient of thermal expansion much like that of the inner holder 86. The lens 110 is received within a bore 114 defined within the lens housing 108. The lens housing 108 is heated to a temperature that expands the bore 114 such that the lens 110 may be received within the lens housing 108. Once the lens housing 108 cools to room temperature, a desired interference fit is formed that holds the lens 110 relative to the lens housing 108.

The probe housing 108 is then inserted within a bore 106 of the outer holder 104. The bore 106 is extended a sufficient length to receive the lens 110 disposed within the lens housing 108. The extended length moves the lip 112 for holding the lens 110 at a desired position within the bore 106. As appreciated, a specific spacing between the optical fiber 72 and the lens 110 as is indicated at 116 is desired. The distance 116 can be adjusted by specifically locating the inner holder 86 relative to the lens housing 108.

In this example where the lens 110 is mounted within the lens housing 108 and is maintained by the desired interference fit eliminates the need for epoxy to support the lens 110 within the housing 100. Accordingly, the example embodiment illustrated in FIG. 5 provides for the use of a focused probe assembly 102 that does require epoxy or other adhesives to maintain the lens 110 in a desired orientation relative to an end of the optical fiber 72.

Figure 6:
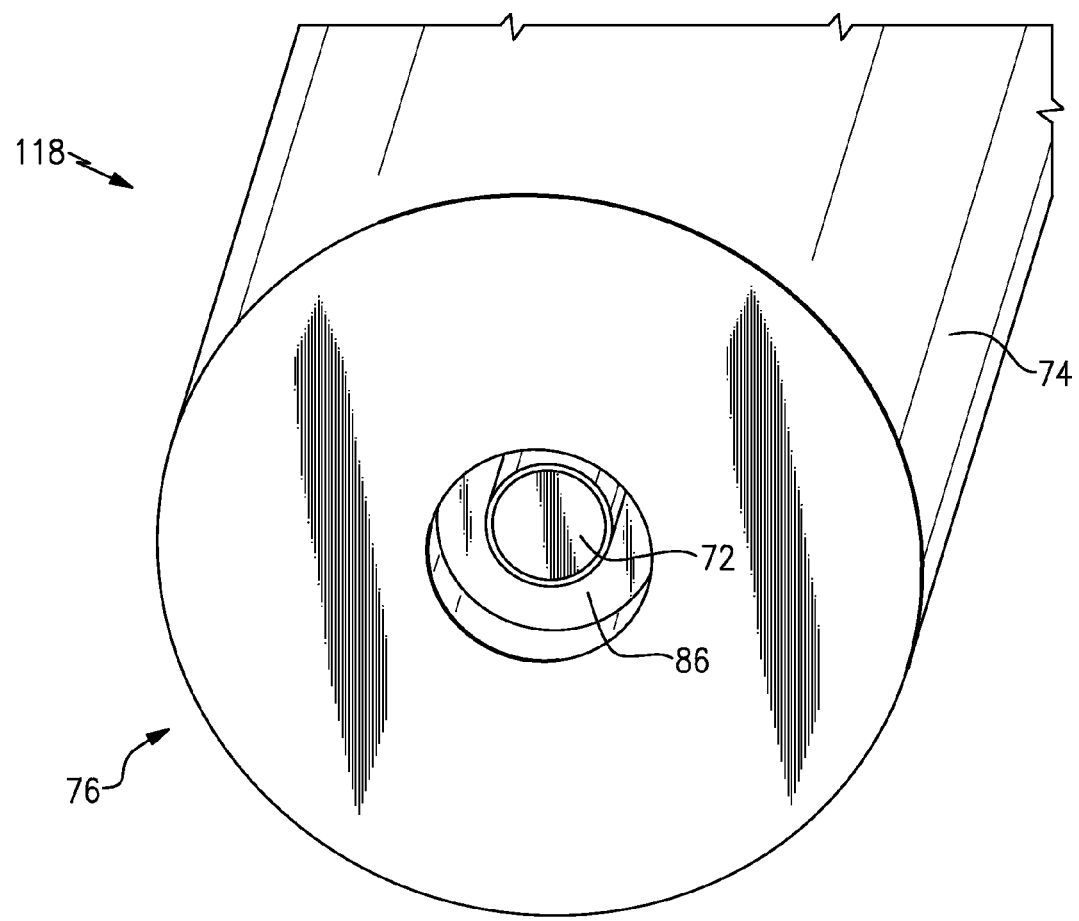
FIG. 6 is a perspective view of an end portion of another example probe assembly.

Referring to FIG. 6, an unfocused probe assembly 118 is illustrated that does not include a lens. In some sensor applications, an unfocused probe can be utilized and provides sufficient data to facilitate the health monitoring of the gas turbine engine as is required. Accordingly, FIG. 6 illustrates the probe assembly 118 that includes the inner holder 86 that holds the optical fiber 72 within the outer holder 74. The outer holder 74 does not support a lens and therefore does not require additional structure required for holding the lens.

Accordingly, the example sensor assembly includes a mounting arrangement that does not require epoxy welding or other adhesives to withstand the extreme temperatures and conditions during operation of the gas turbine engine. Moreover, the example sensor assembly provides a probe assembly that can be mounted and assembled without the use of adhesives or other temperature sensitive materials.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine case assembly comprising:
    a case about a rotational axis of a gas turbine engine; and
    at least one probe assembly supported within the case with the at least one probe assembly including;
        a sensor member;
        an outer holder including a main bore for the sensor member, the outer holder including a first coefficient of thermal expansion; and
        an inner holder including a sensor bore receiving the sensor member such that the sensor member is held within the sensor bore with an interference fit when both the sensor member and inner holder are at a common temperature, wherein the inner holder is disposed within the main bore and includes a second coefficient of thermal expansion greater than the first coefficient of thermal expansion.

2. The gas turbine engine case assembly as recited in claim 1, wherein the sensor member comprises an optical fiber.

3. The gas turbine engine case assembly as recited in claim 1, wherein the main bore includes a first end open to a sensed object with the inner holder disposed at the first end.

4. The gas turbine engine case assembly as recited in claim 3, wherein the main bore includes a lip at the first end for holding the inner holder within the bore.

5. The gas turbine engine case assembly as recited in claim 4, including a lens received within the main bore at the first end.

6. The gas turbine engine case assembly as recited in claim 5, including a lens holder receiving the lens and fit within the main bore, the lens holder having a coefficient of thermal expansion greater than that of the outer holder.

7. The gas turbine engine case assembly as recited in claim 1, the at least one probe assembly includes a probe housing supporting the outer holder and the case includes openings for receiving the probe housing.

8. A gas turbine engine case assembly comprising:
    a case about a rotational axis of a gas turbine engine; and
    at least one probe assembly supported within the case with the at least one probe assembly including;
        a sensor member;
        an outer holder including a main bore for the sensor member, the outer holder including a first coefficient of thermal expansion: and
        an inner holder including a sensor bore receiving the sensor member, wherein the sensor bore includes a relief expanding radially outward, the inner holder disposed within the main bore, wherein the inner holder includes a second coefficient of thermal expansion greater than the first coefficient of thermal expansion.

* * * * *